United States Patent
Shi et al.

(10) Patent No.: US 7,942,629 B2
(45) Date of Patent: May 17, 2011

(54) SYSTEMS AND METHODS INVOLVING WIND TURBINE TOWERS FOR POWER APPLICATIONS

(75) Inventors: Ruijie Shi, Clifton Park, NY (US); Leonardo Cesar Kammer, Niskayuna, NY (US); Charudatta Subhash Mehendale, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 641 days.

(21) Appl. No.: 12/107,327

(22) Filed: Apr. 22, 2008

(65) Prior Publication Data
US 2009/0263245 A1 Oct. 22, 2009

(51) Int. Cl.
*F03D 7/04* (2006.01)
(52) U.S. Cl. ............... 415/119; 415/30; 415/1; 416/40; 416/44
(58) Field of Classification Search .................. 415/119, 415/30, 26, 1; 416/40, 44, 61, 1, 244 R
See application file for complete search history.

(56) References Cited

U.S. PATENT DOCUMENTS

| | | | |
|---|---|---|---|
| 4,435,647 A | 3/1984 | Harner et al. | |
| 6,525,518 B1 | 2/2003 | Garnaes | |
| 7,317,260 B2 | 1/2008 | Wilson | |
| 7,692,322 B2 * | 4/2010 | Wakasa et al. | 290/44 |
| 2006/0033338 A1 * | 2/2006 | Wilson | 290/44 |
| 2008/0290245 A1 * | 11/2008 | Haugsoen et al. | 248/673 |

* cited by examiner

*Primary Examiner* — Ninh H Nguyen
(74) *Attorney, Agent, or Firm* — Ann M. Agosti

(57) ABSTRACT

A system for determining wind turbine tower base torque loads including a controller configured to determine a torque load of a base of a tower of a wind turbine according to a computation of an effective height of the wind turbine multiplied by a wind force upon a rotor of the wind turbine, and generate a control signal representing the torque load. A method for determining wind turbine tower base torque loads including determining a torque load of a base of a tower of a wind turbine according to the foregoing computation, and generating a control signal representing the torque load.

20 Claims, 4 Drawing Sheets

FIG. 4

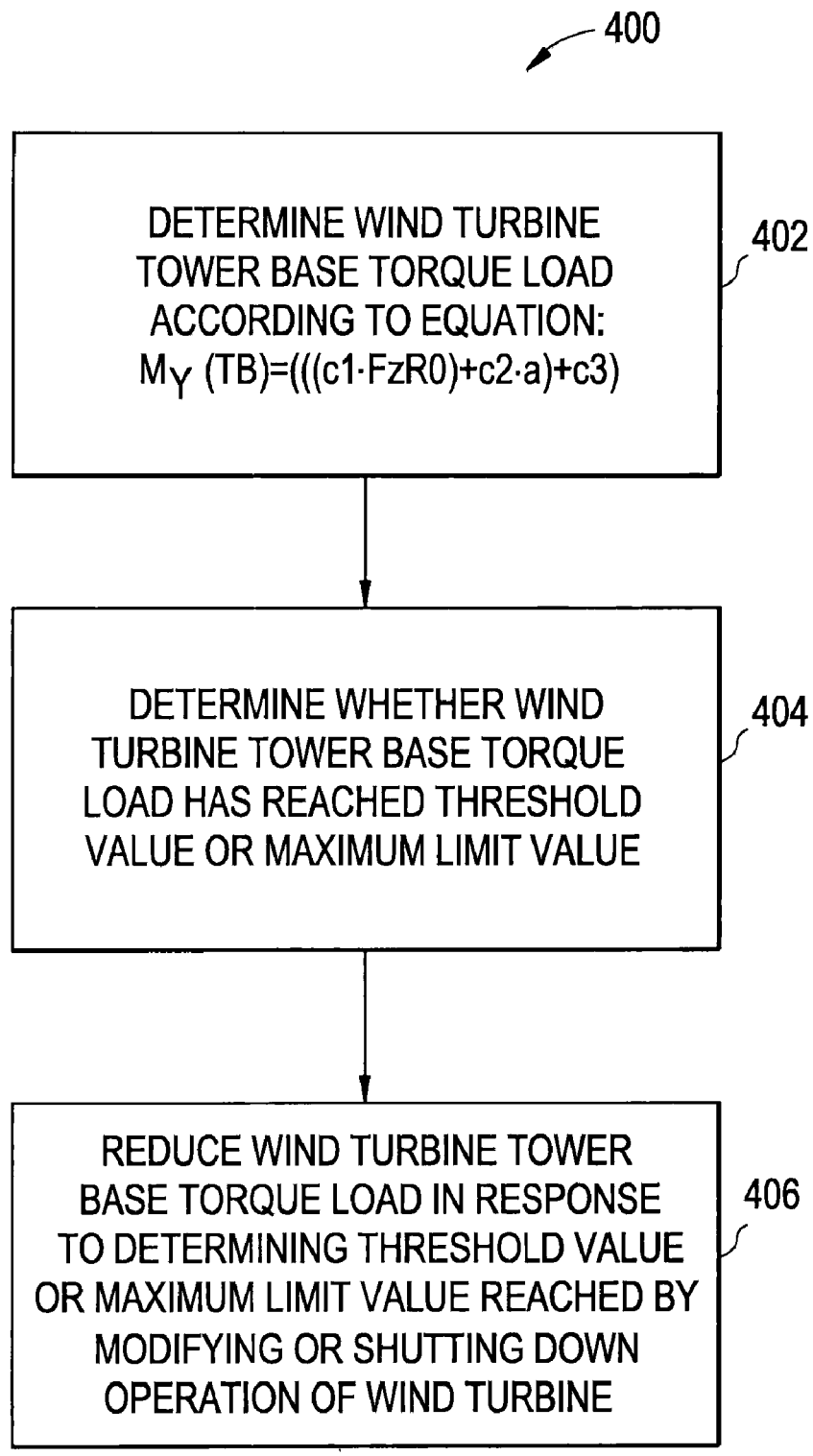

402 — DETERMINE WIND TURBINE TOWER BASE TORQUE LOAD ACCORDING TO EQUATION:
$M_Y(TB) = (((c1 \cdot FzR0) + c2 \cdot a) + c3)$ 404 — DETERMINE WHETHER WIND TURBINE TOWER BASE TORQUE LOAD HAS REACHED THRESHOLD VALUE OR MAXIMUM LIMIT VALUE 406 — REDUCE WIND TURBINE TOWER BASE TORQUE LOAD IN RESPONSE TO DETERMINING THRESHOLD VALUE OR MAXIMUM LIMIT VALUE REACHED BY MODIFYING OR SHUTTING DOWN OPERATION OF WIND TURBINE

SYSTEMS AND METHODS INVOLVING WIND TURBINE TOWERS FOR POWER APPLICATIONS

BACKGROUND

Embodiments of the invention relate generally to wind turbines, and more particularly to systems and methods involving wind turbine towers for power applications.

In this regard, wind turbines include a supporting structure or tower that is secured to the ground or other surface by a base and supports various components of large size and weight, such as a turbine rotor, a generator, and a housing (or "nacelle"). During operation, the combination of the force of the wind and the weight and swaying motion (or oscillation) of the tower and the supported components causes a bending force or torque load on the tower base that is monitored to avoid overloading the base for safe and proper operation of the wind turbine. For example, if the tower base torque load is detected as reaching a maximum limit, the wind turbine operation can be modified or shut down by adjusting one or more operating characteristics. However, the tower base torque load can be complex to determine, for example, through the use of numerous strain gauges and other devices to monitor the wind turbine and estimate the torque load. Thus, a less complex approach to determine the tower base torque load is desirable.

BRIEF DESCRIPTION

Systems and methods involving wind turbine towers for power applications include, in an exemplary embodiment, a system for determining wind turbine tower base torque loads that includes a controller configured to determine a torque load of a base of a tower of a wind turbine according to a computation of an effective height of the wind turbine multiplied by a wind force upon a rotor of the wind turbine, and generate a control signal representing the torque load.

Another exemplary embodiment includes a method for determining wind turbine tower base torque loads that includes determining a torque load of a base of a tower of a wind turbine according to a computation of an effective height of the wind turbine multiplied by a wind force upon a rotor of the wind turbine, and generating a control signal representing the torque load.

BRIEF DESCRIPTION OF THE DRAWINGS

These and other features, aspects, and advantages will become better understood when the following detailed description is read with reference to the accompanying drawings in which like characters represent like parts throughout the drawings, wherein:

FIG. 4 is a flow diagram illustrating an exemplary method for determining wind turbine tower base torque loads in accordance with exemplary embodiments of the invention.

DETAILED DESCRIPTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Torque loads on wind turbine tower bases are monitored and wind turbine operations are modified and/or shut down to reduce these torque loads to avoid overload conditions and ensure safe and proper wind turbine operation. Monitored wind turbine operating characteristics such as wind speed, horizontal acceleration, and turbine rotor speed and blade pitch can be used to determine such wind turbine tower base torque loads.

Figure 1:
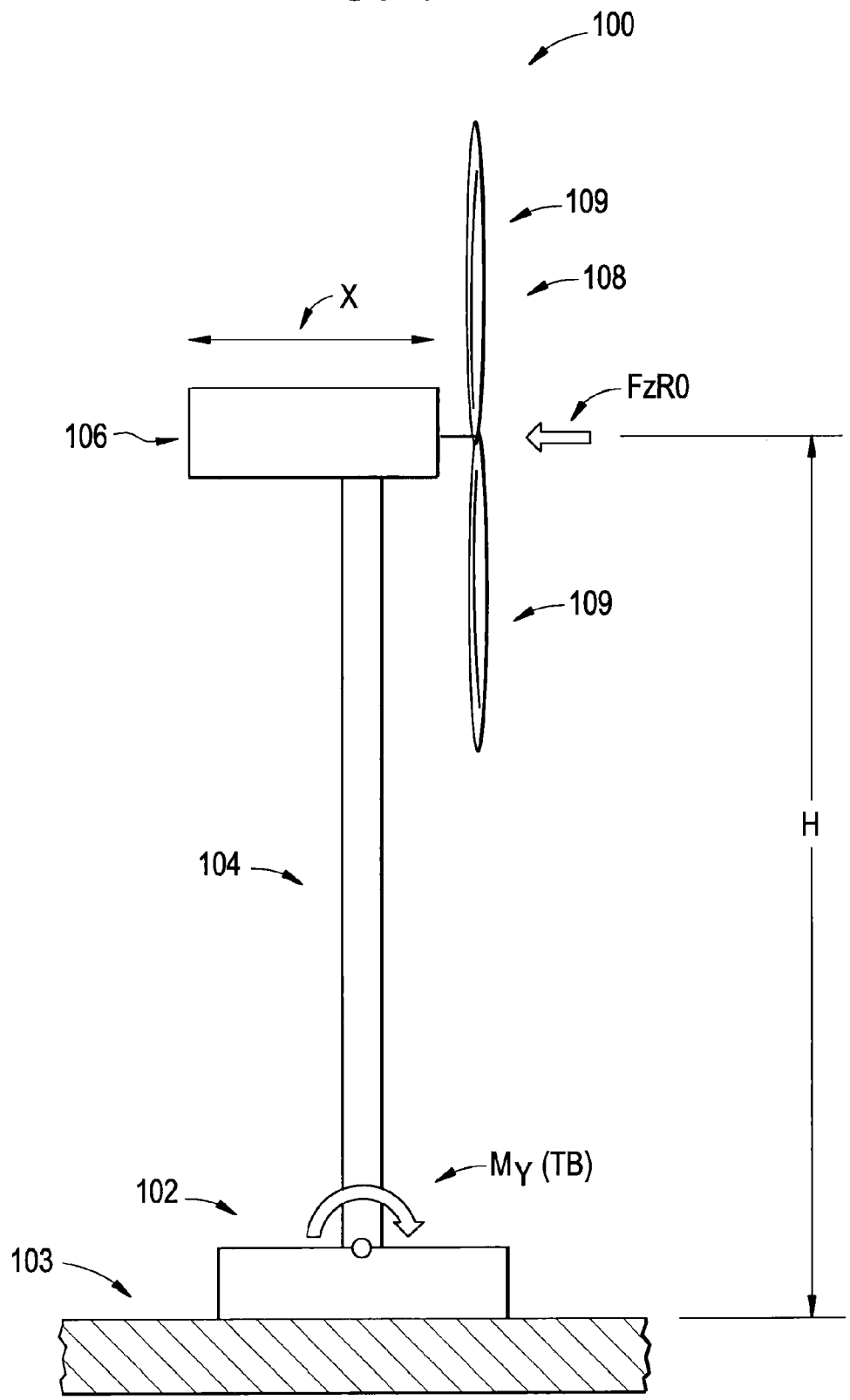
FIG. 1 is a schematic diagram of an exemplary wind turbine illustrating exemplary parameters for determining wind turbine tower base torque loads in accordance with exemplary embodiments of the invention.

FIG. 1 is a schematic diagram of an exemplary wind turbine 100 illustrating exemplary parameters for determining wind turbine tower base torque loads in accordance with exemplary embodiments of the invention. Exemplary wind turbine 100 includes a base 102 that is secured to the ground or other surface 103. A tower 104 is connected to and supported by base 102. Housing or nacelle 106 is connected to and supported by tower 104. Nacelle 106 contains and/or secures one or more components of wind turbine 100, such as a turbine rotor ("rotor") 108 and a generator (not depicted).

Exemplary parameters for determining wind turbine tower base torque loads are illustrated in FIG. 1. A torque load My(TB) of base 102 of tower 104 of wind turbine 100 (i.e., a "wind turbine tower base torque load") is illustrated. This torque load My(TB) may, for example, be the result of a combination of the force of the wind against wind turbine 100 and the weight and movement (e.g., oscillatory motion) of tower 104, nacelle 106, rotor 108, and other components (not depicted), and, thus, may be, e.g., a longitudinal torque load. A wind force (or wind thrust) FzR0 upon rotor 108 of wind turbine 100 is also illustrated, which, e.g., can be measured based on the compressive force upon the shaft of rotor 108. Wind force FzR0 can alternately, e.g., be calculated and/or estimated based on a wind speed relative to nacelle 106, a rotational speed of rotor 108, and a pitch angle of one or more blades 109 of rotor 108, e.g., according to the equation, $FzR0 = Cd \cdot 0.5 \rho v^2 \cdot A$, in which Cd is a rotor wind force coefficient based rotor speed and blade pitch angle, $\rho$ is the air density, v is the wind speed, and A is the area of the rotor. Furthermore, a horizontal position X of nacelle 106 (e.g., a fore-aft position with respect to the attachment of nacelle 106 to tower 104) and a "hub height" H of wind turbine 100 with respect to rotor 108 is also illustrated (e.g., based on a hub connected to the center of rotor 108).

The foregoing exemplary parameters can be used to describe the torque load My(TB) of tower base 102 of wind turbine 100 in accordance with exemplary embodiments of the invention according to the following equation EQ1:

$$My(TB) = c1 \cdot FzR0 + c2 \cdot a + c3 \quad \text{(EQ1)}$$

In equation EQ1, $c_1$ is an effective height of wind turbine 100, e.g., approximately 85% to 125% of hub height H of rotor 108 (which, e.g., may extend from base 102 to the radial center of rotor 108), depending, e.g., on the height above tower base 102 at which wind force FzR0 is applied to and/or effectively acts upon wind turbine 100; $c_2$ ("mass/height coefficient") is the product of a modified effective height of wind turbine 100 (e.g., approximately 80% to 120% of hub height H, depending, e.g., on the amount of oscillation along the height of tower 104 that is similar to the oscillation of the tower top) multiplied by the sum of the mass of the top portion of wind turbine 100 ("tower top", which, e.g., includes nacelle 106 and rotor 108) and the mass of a portion of tower 104 (e.g., approximately 1% to 30% of the tower mass, depending, e.g., on structural characteristics of tower 104 such as the shape); a is a horizontal acceleration of the top of tower 104, for example, based on the horizontal acceleration of nacelle 106, which can be the second derivate of horizontal position X (i.e., $\ddot{X}$), and $c_3$ is a static torque offset of tower base 102, which is equivalent to the torque load of tower base 102 with no wind force and no movement of wind turbine 100 and, e.g., is based on a horizontal position of a gravity center of nacelle 106 and rotor 108 relative to tower 104. Tower base torque load My(TB) is an estimate of the overall tower base torque load based on fore-aft motion of nacelle 106 and results in a value of negligible difference to a corresponding actual (e.g., measured or simulated) overall tower base torque load, since the overall torque increase due to side-to-side motion of nacelle 106 is negligible (e.g., a few percentage or less). This provides for a less complex determination of a tower base torque load based on parameters monitored by one or more components of a wind turbine according to a first order linear equation EQ1.

In accordance with exemplary embodiments of the invention, tower base torque load My(TB) can be determined according to simplified alternatives of EQ1 that provide sufficient accuracy for many applications. A first simplified alternative equation EQ1A does not include static torque offset $c_3$ as follows:

$$My(TB) = c_1 \cdot FzR0 + c_2 \cdot a \quad \text{(EQ1A)}$$

A second simplified alternative equation EQ1B further does not include the product of mass/height coefficient $c_2$ times horizontal acceleration a as follows:

$$My(TB) = c_1 \cdot FzR0 \quad \text{(EQ1B)}$$

Figure 2:
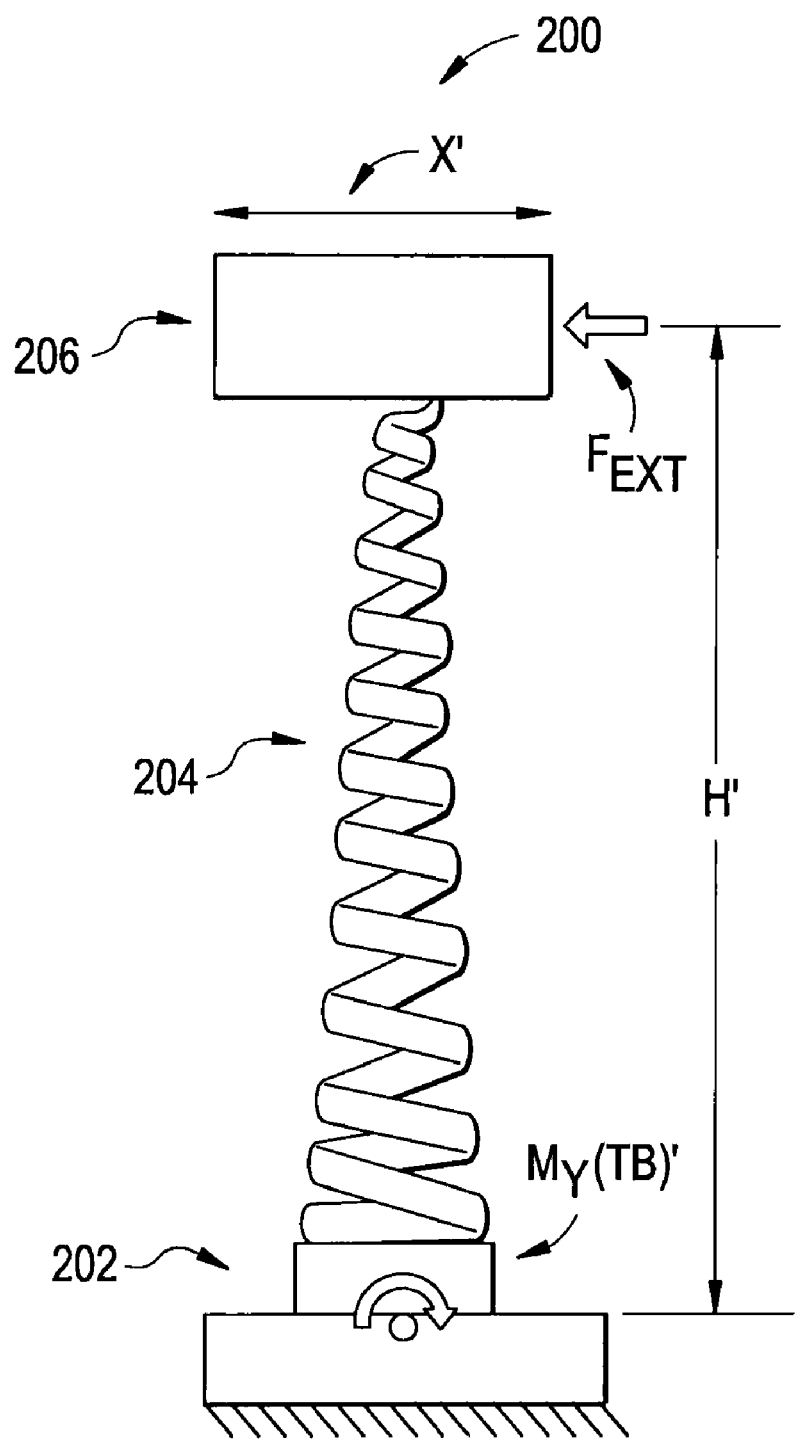
FIG. 2 is a schematic diagram illustrating a model representation of the wind turbine schematic diagram of FIG. 1 in accordance with exemplary embodiments of the invention.

FIG. 2 is a schematic diagram illustrating a model representation ("model") 200 of the wind turbine schematic diagram of FIG. 1 in accordance with exemplary embodiments of the invention. For example, model 200 may be a simplified spring-mass model. Model 200 includes a base 202 that is the same or similar to base 102 described above. Model 200 also includes a spring 204 and mass 206, which model tower 104, nacelle 106 (e.g., including a generator and other components contained in it and/or secured to it), and rotor 108. FIG. 2 also illustrates the parameters of spring base torque load My(TB)' (which models tower base torque load My(TB)), external force Fext (which models wind force FzR0), fore-aft horizontal position X' of mass 206 (which models horizontal position X of nacelle 106), and mass height H' (which models hub height H). These parameters can be used to show a relationship or derivation of EQ1, EQ1A, and EQ1B from a torque load calculation of model 200 in accordance with exemplary embodiments of the invention as follows in equations EQ2-EQ5:

$$\text{(for mass 206)} \quad Fext - Fs2m = ma \quad \text{(EQ 2)}$$

$$\text{(force on spring 204)} \quad Fs2m = Fext + ma \quad \text{(EQ 3)}$$

$$\begin{aligned}\text{(torque load)} \quad My(TB)' &= H' \cdot Fs2m \\ &= H' \cdot Fext + H' \cdot ma \\ &= c_1 \cdot Fext + c_2 \cdot a\end{aligned} \quad \text{(EQ 4)}$$

$$\therefore My(TB)' = c_1 \cdot FzR0 + c_2 \cdot a + c_3 \quad \text{(EQ 5)}$$

From EQ4 to EQ5, $c_3$ is added to represent static torque based on the weight of wind turbine 100, and Fext (which is a total external force upon mass 206) is replaced by FzR0 (which is a fore-aft portion of the total external force). Parameters $c_1$, $c_2$, $c_3$ are described above with respect to wind turbine 100 in accordance with exemplary embodiments of the invention.

Figure 3:
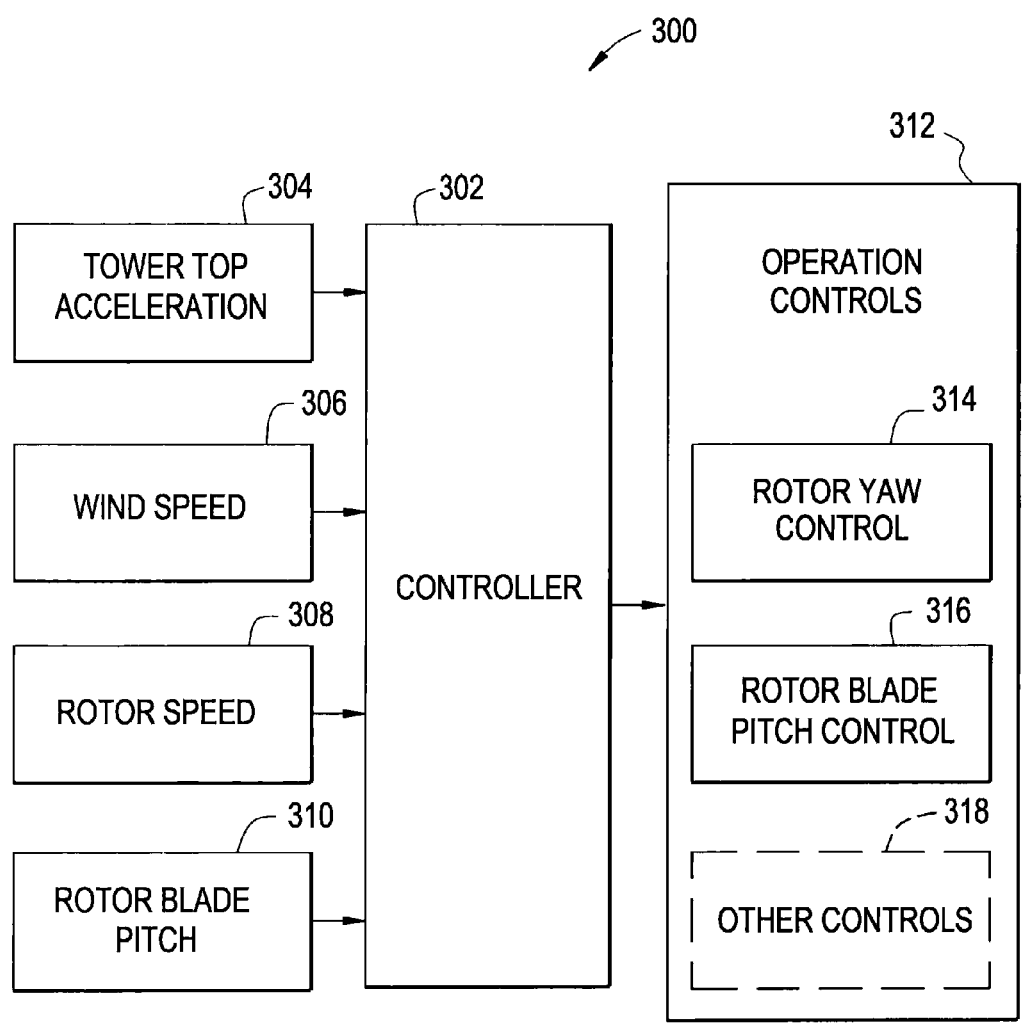
FIG. 3 is a block diagram illustrating an exemplary system for determining wind turbine tower base torque loads in accordance with exemplary embodiments of the invention.

FIG. 3 is a block diagram illustrating an exemplary system 300 for determining wind turbine tower base torque loads in accordance with exemplary embodiments of the invention. Exemplary system 300 includes controller 302 that is configured to determine a wind turbine tower base torque load My(TB) according to equations EQ1, EQ1A, and/or EQ1B described above. Thus, controller 302 may be configured to determine a torque load of a base of a tower of a wind turbine according to a computation of the effective height ($c_1$) of the wind turbine multiplied by the wind force (FzR0) upon the rotor of the wind turbine in some embodiments (e.g., in accordance with EQ1B), plus the mass/height coefficient ($c_2$) of the wind turbine multiplied by the horizontal acceleration (a) of the nacelle of the wind turbine in other embodiments (e.g., in accordance with EQ1A), plus the static torque offset ($c_3$) of the tower base in yet other embodiments (e.g., in accordance with EQ1). Controller 302 may also be configured to generate a signal (e.g., a control signal) representing the torque load, e.g., that may be utilized for other computations, actions, etc. by controller 302 and/or other components of the wind turbine. In some embodiments, controller 302 is further configured to calculate and/or estimate wind force FzR0 upon the rotor of the wind turbine based on the wind speed relative to the nacelle of the wind turbine, a rotational speed of the rotor, and the pitch angle of one or more blades of the rotor, where one or more of these parameters may be a measured or estimated value via one or more components of the wind turbine.

In that regard, controller 302 may be in communication with: a wind speed sensor or estimator 306 (e.g., an anemometer, a light detecting and ranging (LIDAR) system, or a sonic detection and ranging (SODAR) system) of a wind turbine for input of the wind speed; a rotor speed sensor (e.g., that senses the rotor speed) or estimator (e.g., that estimates the rotor speed, e.g., based on the generator speed) 308 of the wind turbine for input of the rotor speed; and a rotor blade pitch sensor 310 of the wind turbine for input of the rotor blade pitch angle. The controller 302 may also be in communication with a tower top acceleration sensor 304 (e.g., an accelerometer that senses the horizontal acceleration of the nacelle, e.g., due to vibration, oscillation, etc.) for input of the horizontal acceleration of the nacelle. In some embodiments, controller 302 is further configured to determine (e.g., based on the generated signal representing the torque load) whether the tower base torque load My(TB) has reached a maximum limit value (e.g., a predetermined value) or a threshold value (e.g., near or approaching the maximum limit value) and to reduce the torque load My(TB) by modifying or shutting down the operation of the wind turbine in response to determining that the torque load My(TB) has reached the maximum limit value or the threshold value. In this regard, controller 302 may also be in communication with one or more operation controls 312 of a wind turbine, which may include a rotor yaw control 314, a rotor blade pitch control 316, and/or other controls 318 of the wind turbine. Controller 302 may be any device, component, etc., or combination thereof, that can be configured accordingly, such as a processor, computing device, protective relaying device, etc.

In an exemplary operation of system 300, controller 302 determines a wind turbine tower base torque load My(TB) according to equation EQ1, EQ1A, and/or EQ1B described above. Thus, controller 302 determines a torque load of a base of a tower of a wind turbine according to a computation of the effective height (c1) of the wind turbine multiplied by the wind force (FzR0) upon the rotor of the wind turbine in some embodiments (e.g., in accordance with EQ1B), plus the mass/height coefficient (c2) of the wind turbine multiplied by the horizontal acceleration (a) of the nacelle of the wind turbine in other embodiments (e.g., in accordance with EQ1A), plus the static torque offset (c3) of the tower base in yet other embodiments (e.g., in accordance with EQ1). Controller 302 may also generate a signal representing the torque load, e.g., that may be utilized for other computations, actions, etc. by controller 302 and/or other components of the wind turbine. In some embodiments, controller 302 calculates and/or estimates wind force FzR0 upon a turbine rotor of the wind turbine based on the wind speed relative to the nacelle of the wind turbine, a rotational speed of the rotor, and the pitch angle of one or more blades of the rotor, where these parameters may be obtained from the inputs of sensors 304, 306, 308, 310 as described above. Controller 302 also determines whether the tower base torque load My(TB) has reached a maximum limit value or a threshold value (e.g., which has been pre-set to controller 302) and to reduce the torque load My(TB) by modifying or shutting down the operation of the wind turbine via one or more operation controls 312 in response to determining that the torque load My(TB) has reached the maximum limit value or the threshold value. For example, controller 302 may modify or shut down the operation of the wind turbine by causing an adjustment in the rotational position of the rotor via rotor yaw control 314 and/or an adjustment in the rotation speed of the rotor via other controls 318 (e.g., that control the generator power settings) that reduces the torque load My(TB) of the base. As another example, controller 302 may modify or shut down the operation of the wind turbine by causing an adjustment in a pitch angle of one or more blades of the rotor via rotor blade pitch control 316 that reduces the torque load My(TB) of the base.

The foregoing exemplary operations of system 300 can also describe a method for determining wind turbine tower base torque loads in accordance with exemplary embodiments of the invention. In that regard, FIG. 4 is a flow diagram illustrating an exemplary method 400 for determining wind turbine tower base torque loads in accordance with exemplary embodiments of the invention. Exemplary method 400 includes block 402 in which a wind turbine tower base torque load My(TB) is determined according to equation EQ1, EQ1A, and/or EQ1B described above, which may also be described as determining the torque load of the base of the tower of the wind turbine according to a computation of the effective height (c1) of the wind turbine multiplied by the wind force (FzR0) upon the rotor of the wind turbine in some embodiments (e.g., in accordance with EQ1B), plus the mass/height coefficient (c2) of the wind turbine multiplied by the horizontal acceleration (a) of the nacelle of the wind turbine in other embodiments (e.g., in accordance with EQ1A), plus the static torque offset (c3) of the tower base in yet other embodiments (e.g., in accordance with EQ1). A signal (e.g., a control signal) representing the torque load may also be generated with respect to block 402. The determining of a wind turbine tower base torque load My(TB) in block 402 can be further performed in accordance with the exemplary operation of system 300 described above. For example, in some embodiments, wind force FzR0 used in determining a torque load MY(TB) according to equation EQ1, EQ1A, or EQ1B can be calculated and/or estimated based on a wind speed relative to the nacelle of the wind turbine, a rotational speed of the rotor of the wind turbine, and a pitch angle of one or more blades of the rotor.

Exemplary method 400 also includes block 404 in which it is determined (e.g., based on the generated signal representing the torque load) whether the tower base torque load My(TB) has reached a maximum limit value or a threshold value, which, e.g., may be a predetermined value. Exemplary method 400 further includes block 406 in which the torque load My(TB) is reduced by modifying or shutting down the operation of the wind turbine in response to determining that the torque load My(TB) has reached the maximum limit value or the threshold value. This reducing can also be further performed in accordance with the exemplary operation of system 300 described above. For example, the operation of the wind turbine may be modified or shut down by causing an adjustment in the rotational position of the rotor and/or the rotation speed of the rotor that reduces the torque load My(TB) of the base. As another example, the operation of the wind turbine may be modified or shut down by causing an adjustment in a pitch angle of one or more blades of the rotor that reduces the torque load My(TB) of the base.

Exemplary system 300 for determining wind turbine tower base torque loads is illustrated and described with respect to various elements, components, etc., such as controller 302, sensors 304, 306, 308, 310, and operation controls 312 (which includes controls 314, 316, 318) for exemplary purposes. However, it should be understood that other variations, combinations, or integrations of such elements that provide the same features, functions, etc. are included within the scope of embodiments of the invention. For example, functions of controller 302 may be incorporated into another controller of a wind turbine and/or operation controls 312. Other possibilities will be recognized in light of the description herein. Furthermore, it should be understood with respect to the exemplary schematic diagrams of FIGS. 1 and 2 that the directions of the exemplary parameters illustrated therein are exemplary and may be different from that depicted in accordance with some embodiments. For example, wind force FzR0 may act upon rotor 108 from an opposite (e.g., aft-to-fore) direction than that depicted in some embodiments. In this regard also, other possibilities will be recognized in light of the description herein.

Exemplary embodiments of the invention can be implemented in hardware, software, or a combination of both. Those embodiments implemented in software may, for example, include firmware, resident software, microcode, etc. Exemplary embodiments of the invention may also be implemented as a computer program product accessible from a computer-usable or computer-readable medium providing program code for use by or in connection with a computer or other instruction execution system. In this regard, a computer-usable or computer-readable medium can be any apparatus that can contain, store, communicate, propagate, or transport the program for use in connection with the instruction execution system, apparatus, or device.

It should be understood that the flow diagram(s) depicted herein are examples. There may be many variations to these diagrams or the blocks (or operations) described therein within the scope of embodiments of the invention. For example, the blocks may be performed in a different order, or blocks may be added, deleted, or modified.

This written description uses examples to disclose the invention, including the best mode, and also to enable practice of the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed is:

1. A system for determining wind turbine tower base torque loads, comprising a controller configured to:
   determine a torque load of a base of a tower of a wind turbine according to a computation of an effective height of the wind turbine multiplied by a wind force upon a rotor of the wind turbine, wherein the effective height is a height from the base at which the wind force is applied to the wind turbine; and
   generate a control signal representing the torque load.

2. The system of claim 1, wherein the computation further comprises the addition of a mass/height coefficient multiplied by a horizontal acceleration of a nacelle of the wind turbine, wherein the mass/height coefficient comprises a product of the effective height of the wind turbine multiplied by a sum of a mass of the nacelle, plus a mass of the rotor, plus 5% to 25% of a mass of the tower.

3. The system of claim 2, wherein the horizontal acceleration of the nacelle is input to the controller from an accelerometer of the wind turbine.

4. The system of claim 2, wherein the computation further comprises the addition of a static torque offset of the base that is equivalent to a torque load of the base when there is no wind force upon the rotor and no movement of the wind turbine.

5. The system of claim 4, wherein the static torque offset is based on a horizontal position of a gravity center of the nacelle and the rotor relative to the tower.

6. The system of claim 1, wherein the effective height of the wind turbine is 90% to 120% of a hub height of the rotor.

7. The system of claim 1, wherein the controller is configured to:
   measure the wind force upon the rotor based on a compressive force upon a shaft of the rotor; or
   calculate the wind force upon the rotor based on a wind speed relative to the nacelle, a rotational speed of the rotor, and a pitch angle of a blade of the rotor.

8. The system of claim 7, wherein:
   the wind speed is input to the controller from a wind speed sensor or estimator of the wind turbine comprising an anemometer, a light detecting and ranging (LIDAR) system, or a sonic detection and ranging (SODAR) system;
   the rotational speed of the rotor is input to the controller from a rotor speed sensor or estimator of the wind turbine; and
   the pitch angle of the blade of the rotor is input to the controller from a pitch angle sensor of the wind turbine.

9. The system of claim 1, wherein the controller is further configured to determine, based on the control signal, whether the torque load of the base has reached a maximum limit value or a threshold value, and to reduce the torque load of the base by modifying or shutting down an operation of the wind turbine in response to determining that the torque load has reached the maximum limit value or the threshold value.

10. The system of claim 9, wherein the controller is configured to modify or shut down an operation of the wind turbine by:
    causing an adjustment in a rotational position of the rotor that reduces the torque load of the base;
    causing an adjustment in a rotation speed of the rotor that reduces the torque load of the base; or
    causing an adjustment in a pitch angle of a blade of the rotor that reduces the torque load of the base.

11. A method for determining wind turbine tower base torque loads, comprising:
    determining a torque load of a base of a tower of a wind turbine according to a computation of an effective height of the wind turbine multiplied by a wind force upon a rotor of the wind turbine, wherein the effective height is a height from the base at which the wind force is applied to the wind turbine; and
    generating a control signal representing the torque load.

12. The method of claim 11, wherein the computation further comprises the addition of a mass/height coefficient multiplied by a horizontal acceleration of a nacelle of the wind turbine, wherein the mass/height coefficient comprises a product of the effective height of the wind turbine multiplied by a sum of a mass of the nacelle, plus a mass of the rotor, plus 5% to 25% of a mass of the tower.

13. The method of claim 12, wherein the horizontal acceleration of the nacelle is input to the controller from an accelerometer of the wind turbine.

14. The method of claim 12, wherein the computation further comprises the addition of a static torque offset of the base that is equivalent to a torque load of the base when there is no wind force upon the rotor and no movement of the wind turbine.

15. The method of claim 14, wherein the static torque offset is based on a horizontal position of a gravity center of the nacelle and the rotor relative to the tower.

16. The method of claim 11, wherein the effective height of the wind turbine is 90% to 120% of a hub height of the rotor.

17. The method of claim 11, wherein the wind force upon the rotor is:
    measured based on a compressive force upon a shaft of the rotor; or
    calculated based on a wind speed relative to the nacelle, a rotational speed of the rotor, and a pitch angle of a blade of the rotor.

18. The method of claim 17, wherein:
    the wind speed is obtained from a wind speed sensor or estimator of the wind turbine comprising an anemometer, a light detecting and ranging (LIDAR) system, or a sonic detection and ranging (SODAR) system;
    the rotational speed of the rotor is obtained from a rotor speed sensor or estimator of the wind turbine; and
    the pitch angle of the blade of the rotor is obtained from a pitch angle sensor of the wind turbine.

19. The method of claim 11, further comprising:
    determining, based on the control signal, whether the torque load has reached a maximum limit value or a threshold value; and
    reducing the torque load of the base by modifying or shutting down an operation of the wind turbine in response to determining that the torque load has reached the maximum limit value or the threshold value.

20. The method of claim 19, wherein modifying or shutting down an operation of the wind turbine comprises:
    causing an adjustment in a rotational position of the rotor that reduces the torque load of the base;
    causing an adjustment in a rotation speed of the rotor that reduces the torque load of the base; or
    causing an adjustment in a pitch angle of a blade of the rotor that reduces the torque load of the base.

* * * * *